Jan. 2, 1945.   J. F. KIENNINGER   2,366,267
PHOTOGRAPHIC PRINTING
Filed May 1, 1940   4 Sheets-Sheet 4
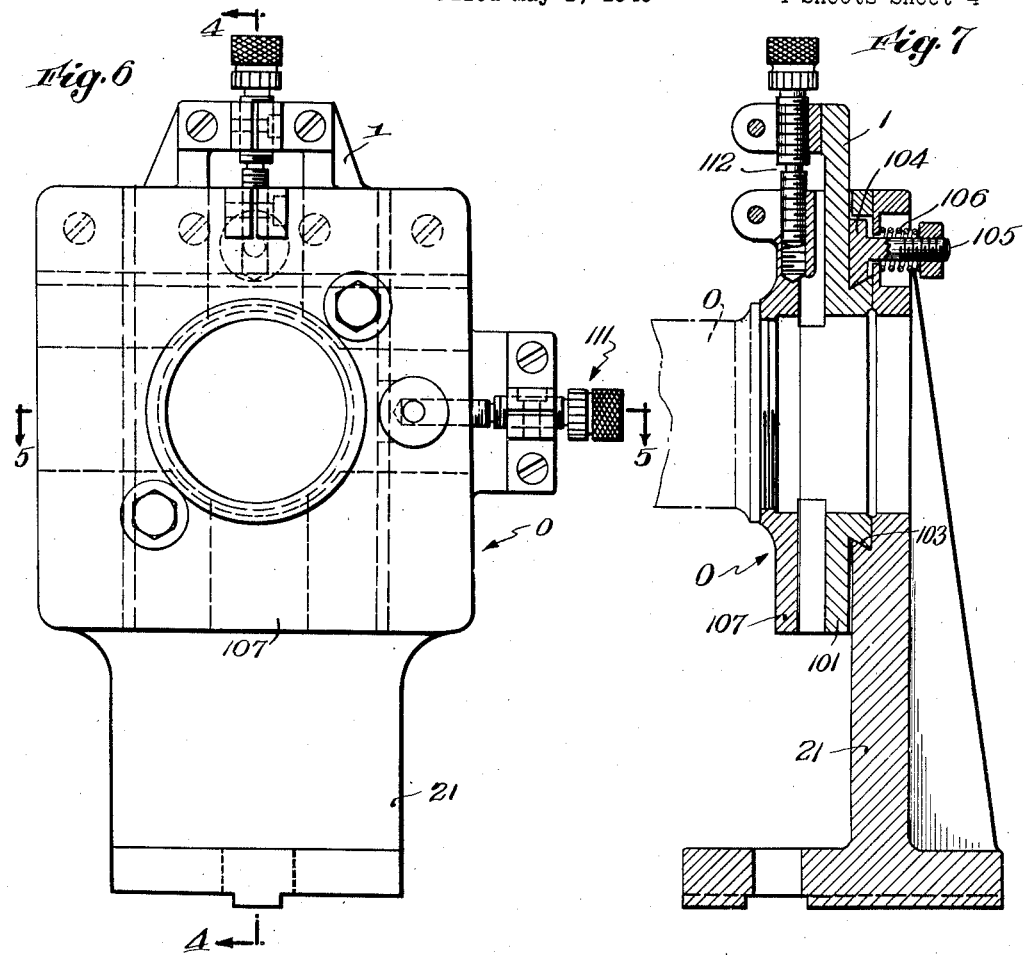
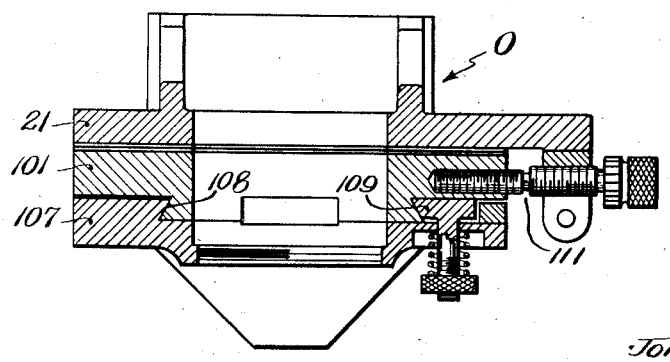

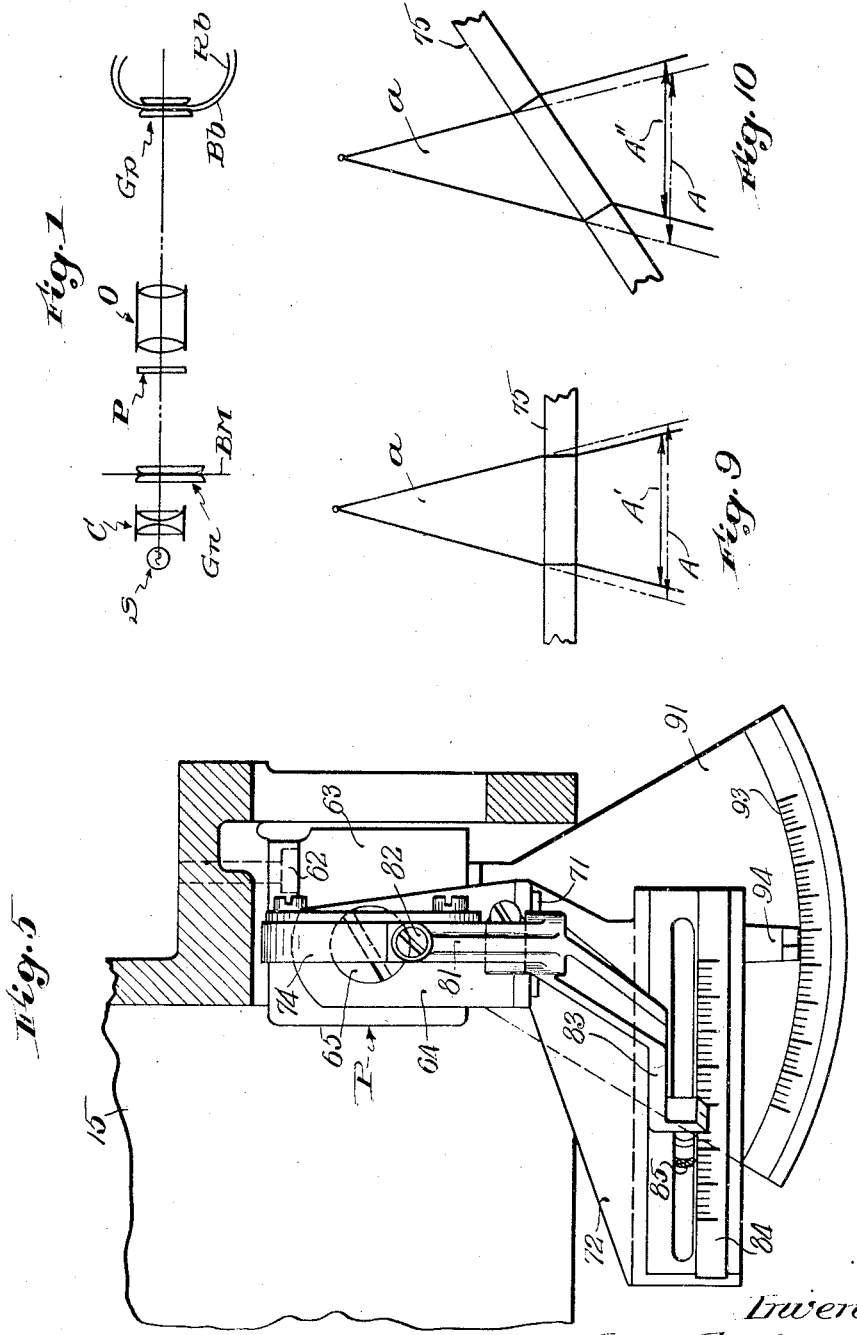

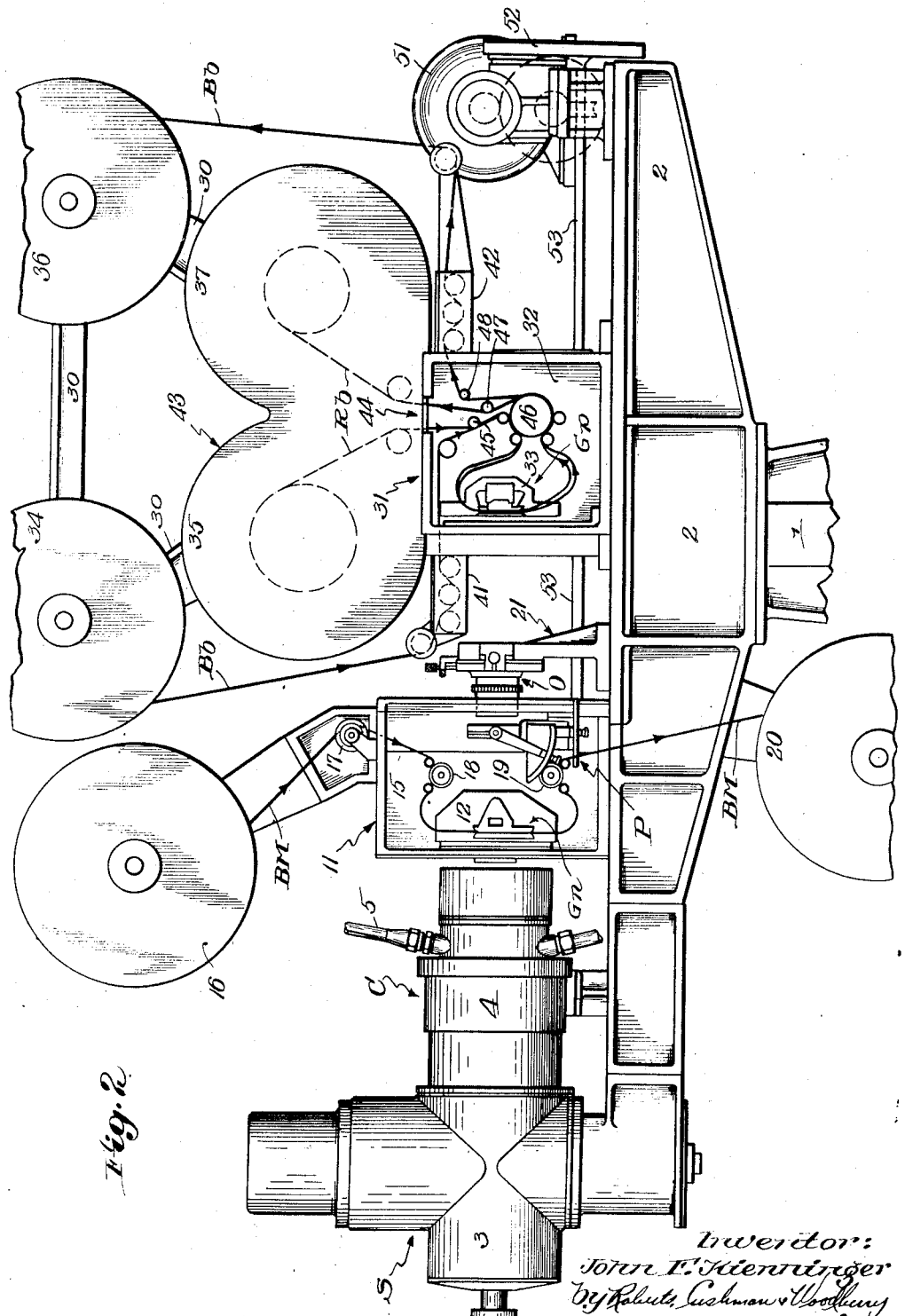

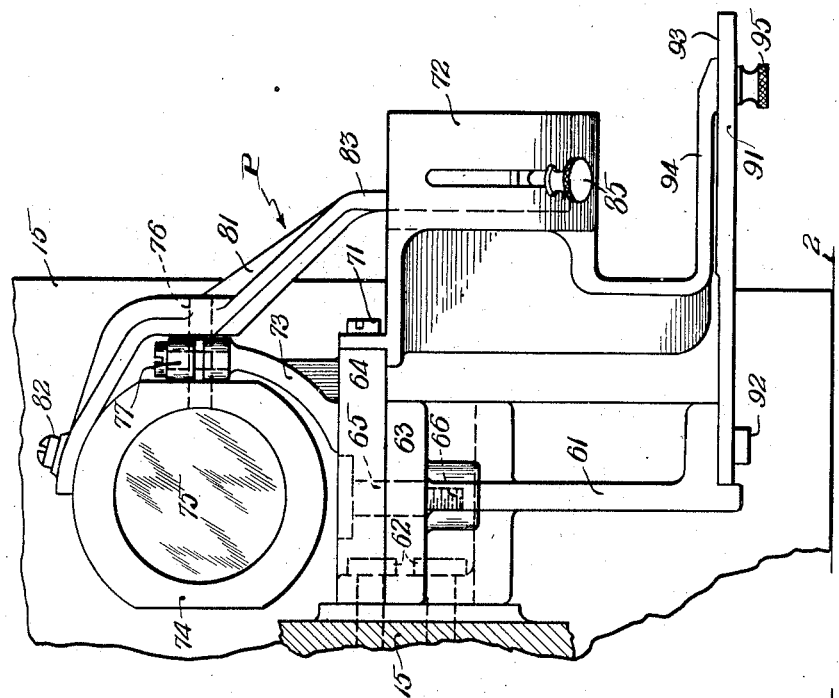
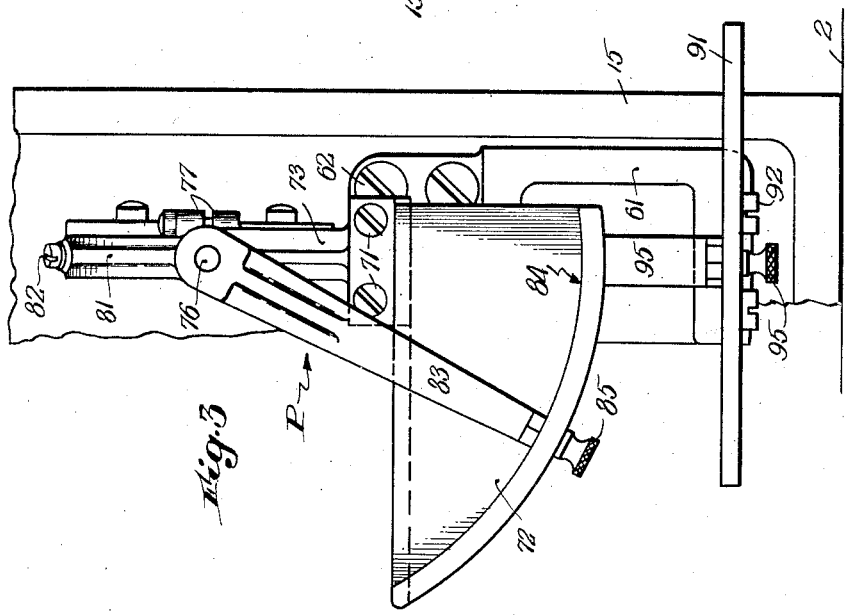

Patented Jan. 2, 1945

2,366,267

UNITED STATES PATENT OFFICE 2,366,267

PHOTOGRAPHIC PRINTING

John F. Kienninger, Los Angeles, Calif., assignor to Technicolor Motion Picture Corporation, Los Angeles, Calif., a corporation of Maine Application May 1, 1940, Serial No. 332,755

3 Claims. (Cl. 88—24)

This invention relates to motion picture photography and especially to printing photographic reproductions by optical projection.

In the art of copying motion picture records it is sometimes necessary to print simultaneously from two records in exact register onto a sensitive film.

The method of making special process (trick) films as disclosed in copending application Serial No. 285,067, filed July 18, 1939, and assigned to the present assignee, is an example for this kind of printing; the two records used for simultaneous printing are an original (or a master positive or duplicate negative) and a so-called mask. Another example is the projecting of wipe mattes onto a duplicate film and a recording film in contact.

In such instances it is necessary to retain maximum definition in printing from original to reproduction as well as to provide for compensation of possible incongruities between the two records from which the exposure is made. Maximum definition can best be obtained by way of contact printing, whereas this latter printing technique does not permit any adjustment of the effective size or shape of the image derived from a record to be printed. Such adjustment is often desirable since the processing of the original record or its duplicate, and of the mask which may be made on different photographic material by different methods, may cause incongruity as to size, shape and relative position of such corresponding patterns of these records which must be in exact register.

It is the main object of the present invention to provide a method, and apparatus for carrying it out, of reproducing two records by preserving maximum definition in the transfer from originals to print and yet permitting adjustment of relative size and shape of the two original records and the print. Another object is to provide a projection printer for simultaneously exposing a sensitive emulsion to an original record and a mask record in a manner providing maximum definition of the final print and exact register between the images of the two records, although these records themselves may not be in register. In one aspect, the invention provides for elimination from a light beam used for contact printing, of a portion substantially congruent with such a portion of an original record which is not to be reproduced and for exact registering of size and shape of that portion with a corresponding portion of the original record. In another aspect, the invention provides for simultaneous contact and projection printing respectively of two records on a single film and for adjusting size, shape and position of a projected image, of one record relatively to the other record.

These and other objects and aspects of the invention will be apparent from the following description of a specific embodiment of the invention by way of explaining its genus. This description refers to drawings on which Fig. 1 is a diagram explaining the general arrangement for carrying out the invention;

Fig. 2 a side elevation showing more in detail the elements schematically indicated in Fig. 1;

Fig. 3 a side elevation in larger scale of the compensating unit shown in Fig. 2;

Fig. 4 a front elevation corresponding to Fig. 3;

Fig. 5 a plan corresponding to Fig. 3, with the stand in horizontal section;

Fig. 6 a front view in larger scale of the lens element shown in Fig. 2, seen from the lefthand side of Fig. 1;

Fig. 7 a section on lines 4—4 of Fig. 6;

Fig. 8 a section on lines 5—5 of Fig. 6; and

Figs. 9 and 10 are diagrams illustrating the function of the compensating unit.

The printing process according to the invention will first be explained generally with reference to Fig. 1. In this figure, BM and B$b$ are two correlated film records confined in given planes by suitable guides G$n$ and G$p$. The positive light sensitive film R$b$ is superimposed with direct contact of the emulsions on record B$b$ in guide G$p$. The two film records may for example be the background matte BM and the background record B$b$ indicated in Fig. 3 of the above-mentioned copending application. It will of course be understood that any other matte and picture record or indeed any other two records to be printed in register may take the place of this matte and negative film.

A light source S, through an optical system C of any desired type, illuminates film BM which is imaged on films B$b$ and R$b$ by a suitable objective system O. An optical register compensator P is inserted between the two original films. Objective O and compensator P are adjustable (in a manner which will be described in detail hereinafter) to provide exact register between the image of BM on B$b$, so that the sensitive emulsion of R$b$ will be exposed to an image which is a combination of records BM and B$b$ in exact register. If, as in the present example, record B$b$ is the one containing the pictorial detail, the definition of this picture will be preserved because record B*b* is in direct contact with the emulsion of R*b*; on the other hand any disparities between the pattern of mask record BM which is to limit the area to be printed from picture B*b*, and the pattern of the latter can be compensated by relatively shifting record B*b* and the image of BM imaged thereon.

An actual printing machine incorporating the essential elements schematically shown in Fig. 1 and found to be especially suitable for carrying out the printing process according to the invention will now be described by way of example, with reference to Figs. 2 to 8. In Fig. 2, a column 1 supports a rigid base plate 2 on which are mounted a housing 3 for the light sources; lens mount 4 supporting an illuminating system similar to that described in copending application Serial No. 259,848, filed March 4, 1939, and assigned to the present assignee, and including cooling water connections 5 and 6; and negative head 11 for film BM including a conventional film movement 12 (for example of the type described in Patent No. 2,063,016) enclosed in a housing 15 which supports supply film reel 16 for film BM running over guide roll 17 and sprockets 18 and 19, a take-up reel 20 being mounted directly on base 2, and a compensator P which will be described in detail with reference to Figs. 6 to 8.

Base plate 2 further supports lens mount 21 adjustably supporting objective O in a manner to be described in detail with reference to Figs. 3 to 5; and a positive head 31 with housing 32 for positive film movement 33 similar to movement 12 but accommodating two films, namely B*b* and R*b* which come from supply reels 34, 35 and are taken up on reels 36 and 37 respectively, film B*b* entering and leaving the light-proof housing 32 through seals 41 and 42 mounted on housing 32. Reels 34 and 36 are supported on housing 32 by frame 30. Reels 35 and 37 for the light sensitive film R*b* are enclosed in a magazine 43 mounted on housing 32, the film entering and leaving that housing through a light trap 44 for example of the type described in Patent No. 2,152,369. The two films come into contact on guide roll 45, pass together over sprocket 46, are fed together through film gate 33, and pass again over sprocket 46, leaving which they are separated again by rolls 47 and 48.

Base plate 2 finally supports a motor 51 driving through gear 52 and shaft 53 the two film movements 12 and 33 at equal speed, as well as take-up reels 20, 36 and 37. This drive may take any suitable form, but will be rather similar to that described in Patent No. 2,047,943 although simpler since the provisions for coupling two sets of printing heads are herein unnecessary.

Referring now to Figs. 3 to 5, the compensator P is mounted on a bracket 61 at 62 screwed to negative film gate housing 15 and having a table 63. A swinging arm 64 is rotatably attached to table 63 by means of a pivot pin 65 at 66 screwed into bracket 61. At 71, a shell 72 is screwed to arm 64 and hence rotates with the latter. Integral with arm 64 is a stand 73 rotatably supporting plate mount 74 with glass plate 75 fastened to a pin 76 rotatably resting in split bearing 77 at the end of stand 73.

Pin 76 is also fastened to an indicator lever 81, one end of which is at 82 screwed to mount 74 whereas the other end is shaped to form an indicator 83 playing over scale 84 of shell 72. By means of thumb screw 85, lever 83 and hence plate 75 can be fixed relatively to shell 72.

A scale plate 91 is at 92 screwed to bracket 61, this plate forming a scale 93 (Fig. 5) on which plays an indicator 94 integral with shell 72. A thumb screw 95 permits fixation of shell 72 and hence plate 75 if thumb screw 85 is also tightened.

The optically effective element of the above described compensator is a plate 75 of suitable transparent material which, in the above described embodiment, may be an optical glass flat about one mm. thick. The function of this plate will be clear from Figs. 9 and 10. In Fig. 9, a beam of light *a* may normally produce an image A; if plate 75 is inserted normal to the optical axis of the beam, the new image A' will be reduced in size as compared to A due to the well known plate effect, whereas the vergence of the image carrying beam will not be affected; in other words, the plate changes the image size but has no optical power. If the plate is inclined to the beam as shown in Fig. 10, the modified image A'' will also be shifted laterally on the optical axis. If Fig. 9 represents for example a vertical section through plate 75 on pivot 65 and Fig. 10 a horizontal section on pivot 76, the size of the image will be somewhat magnified in the horizontal axis as compared to its dimension in the vertical axis, together with a slight movement of the optical axis in horizontal direction. Hence, rotation of plate 75 about the horizontal or vertical axis, respectively, will effect minute image magnification in the vertical or horizontal axis, respectively, the amount of magnification depending on the angle of rotation. Scales 84 and 93 can be calibrated directly in per cent magnification. Of course, different magnifications in the respective directions can be obtained by suitably rotating plate 75 about both pivots. The shifting of the optical axis can be compensated by realigning films and objective O, preferably by slightly shifting the latter in the manner now to be described.

Referring to Figs. 6 to 8, stand 21 slidingly supports a slide plate 101 by means of dovetail 103 and fixation gib 104 (Fig. 7) held on stand 21 by screw 105 and spring 106 in well known manner. Lens mount 107 similarly slides on plate 101 by means of dovetail 108 and gib 109 (Fig. 8). Objective O is fastened to lens mount 107 in the usual manner by means of a focusing thread. Precision alignment of lens O relatively to stand 21 and hence base plate 2 and the films is provided by means of horizontal micrometer 111 between stand 21 and slide 101 and vertical micrometer 112 between slide 101 and objective mount 107. By turning micrometers 111 or 112, or both, the objective can be slightly moved in vertical and horizontal direction, for the purpose of alignment generally and especially also for the above-mentioned realignment after rotation of register compensating plate 75.

It will be understood that different image size and image position adjusting means may be employed instead of the above-described plate compensator and micrometer lens mount.

The printing process according to the invention may be carried out as follows with the aid of apparatus as above described by way of example.

Film record B*b* and sensitive film R*b* are together threaded into film gate 33, with the emulsion sides in contact. Film record BM is threaded in such position that the pattern outline of its image on B*b* will at least approximately register with the corresponding pattern of picture film B*b*. By rotating plate 75 and shifting objective O the image of mask BM on film B*b* and the picture record of B*b* are then brought into exact register and alignment; it will now be evident that image dimensions in any direction can be changed by appropriately rotating plate 75 and that the image of BM and the record B*b* can then be brought into alignment by shifting the lens system O in order to eliminate image displacement. Of course, image size adjustment, alignment or framing, and focusing will be carried out if necessary in alternating steps, depending on the adjustments necessary in any particular instance. The motor 51 is then started and the printing and subsequent developing of film R*b* are carried out in the usual manner.

It will now be evident that the photographically very dense portion of mask record BM eliminates from the light beam exactly that part which would cover the corresponding portion of film B*b*, leaving that portion substantially unexposed and ready to receive exposure from another record combined with a second complementary mask covering the previously exposed portions. As previously stated, printing according to the present invention permits the carrying out of these rather complicated and delicate printing operations while establishing and maintaining register between mask and picture records, and preserving the definition of the picture record as printed on the copy.

If it is desired to provide for fading or lap dissolving in conjunction with the above-described use of a traveling matte, for overlay titles or other figured overlays in addition to the matte running in the negative aperture, the latter is constructed similar to positive head G*p* of Fig. 2, namely, with double feed and take-up.

It should be understood that the present disclosure is for the purpose of illustration only and that this invention includes all modifications and equivalents which fall within the scope of the appended claims.

I claim:

1. In the art of making a printed film from a printing film and a masking film in a projection printer having a first film gate from which records may be projected and a second film gate to receive the projected records and an intermediate objective lens, the method which comprises feeding the masking film through said first film gate, simultaneously feeding the printing and printed films in contact with each other through said second film gate with the printing film between the other two films, projecting a beam of light through the masking film, thence through said lens and thence through the printing film to the printed film, to reproduce on the printed film portions of the records of the printing film determined by the outlines of the masking film, and concomitantly adjusting the size of the projected outlines relatively to the other two films, without changing the focus of the projected beam, until the outlines have a predetermined size.

2. In the art of making a printed film from a printing film and a masking film in a projection printer having a first film gate from which records may be projected and a second film gate to receive the projected records, and an intermediate objective lens, the method which comprises feeding the masking film through said first film gate, simultaneously feeding the printing and printed films in contact with each other through said second film gate with the printing film between the other two films, projecting a beam of light through the masking film, thence through said lens and thence through the printing film to the printed film, to reproduce on the printed film portions of the records of the printing film determined by the outlines of the masking film, and concomitantly adjusting the size and position of the projected outlines relatively to the other two films, independently of said lens, until the outlines have a predetermined size.

3. In the art of making a printed film from a printing film and a masking film in a projection printer having a first film gate from which records may be projected and a second film gate to receive the projected records and an intermediate objective lens, the method which comprises feeding the masking film through said first film gate, simultaneously feeding the printing and printed films in contact with each other through said second film gate with the printing film between the other two films, projecting a beam of light through the masking film, thence through said lens and thence through the printing film to the printed film, to reproduce on the printed film portions of the records of the printing film determined by the outlines of the masking film, concomitantly adjusting the size and position of the projected outlines relatively to the other two films, without changing the focus of the projected beam, until the outlines have a predetermined size, and then laterally shifting the objective lens to compensate for the aforesaid adjustment of position, thereby effecting an adjustment in the size of the projected outlines while maintaining the proper position of the outlines in relation to the records on the printing film.

JOHN F. KIENNINGER.